April 21, 1942.    E. A. SPERRY, JR    2,280,726
MAGNETIC COMPASS
Filed June 10, 1939

INVENTOR
ELMER A. SPERRY, JR.
BY
Joseph H. Lipschutz
ATTORNEY

Patented Apr. 21, 1942

2,280,726

UNITED STATES PATENT OFFICE 2,280,726

MAGNETIC COMPASS

Elmer A. Sperry, Jr., New York, N. Y., assignor to Sperry Products, Inc., Hoboken, N. J., a corporation of New York Application June 10, 1939, Serial No. 278,443

6 Claims. (Cl. 33—223)

This invention relates to magnetic compasses and has for its principal object the provision of a compass which will enable the pilot to navigate a course, particularly a straight course, without having the compass subjected to the recurring errors due to acceleration forces. The difficulty attending the flying of a straight course by magnetic compasses has been fully set forth in the application of Charles Stark Draper and Walter McKay, Serial No. 186,156, filed January 21, 1938, and, briefly stated, this difficulty is known as the northerly turning error and is defined as that error which is experienced by the compass card during flight of the craft upon any course having a northerly or southerly component. The error manifests itself during turns, or even during yawing and rolling movements attendant on straight flight in any but perfectly smooth air, by turning of the compass card in the same direction as the craft when traveling on a course having a northerly component and in the opposite direction when traveling on a course having a southerly component, and at a faster rate in the initial instants, hence indicating to the pilots a turn in the opposite direction to that his craft is making. Therefore the pilot watches his other instruments, such as his turn indicator and directional gyro, to fly a straight course, since these instruments detect turns away from said course. It is obvious, however, that if the northerly turning error could be substantially eliminated from the magnetic compass the pilot would be able to detect deviations from a straight course.

In the said patent application of Draper and McKay there was disclosed the general solution for the elimination of the turning error, said solution consisting in providing a magnetic compass having a meridian seeking element wherein the undamped Z period (that is, the period around the vertical axis) is in excess of a critical point. It is the principal object of this invention to provide a specific construction of meridian seeking element which will fulfil substantially the hereinbefore specified conditions for the practical elimination of the northerly turning error.

Further objects and advantages of this invention will become apparent in the following detailed description.

In the accompanying drawing.

Figure 1:
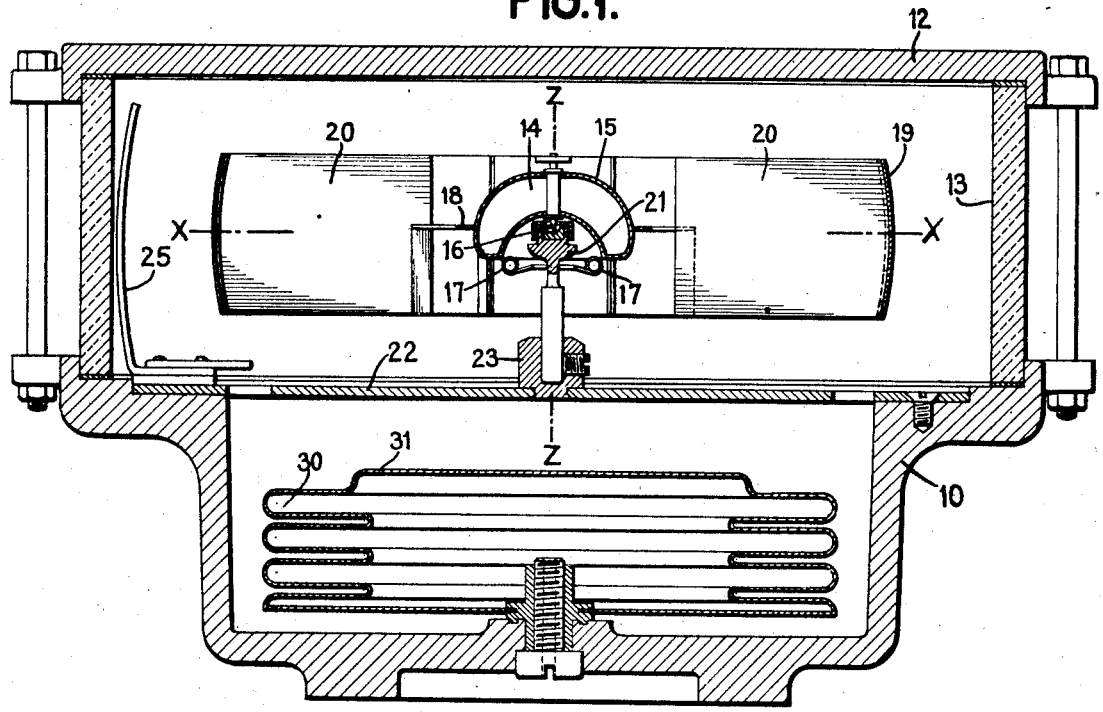
Fig. 1 is a vertical section through a magnetic compass embodying my invention.
Figure 2:
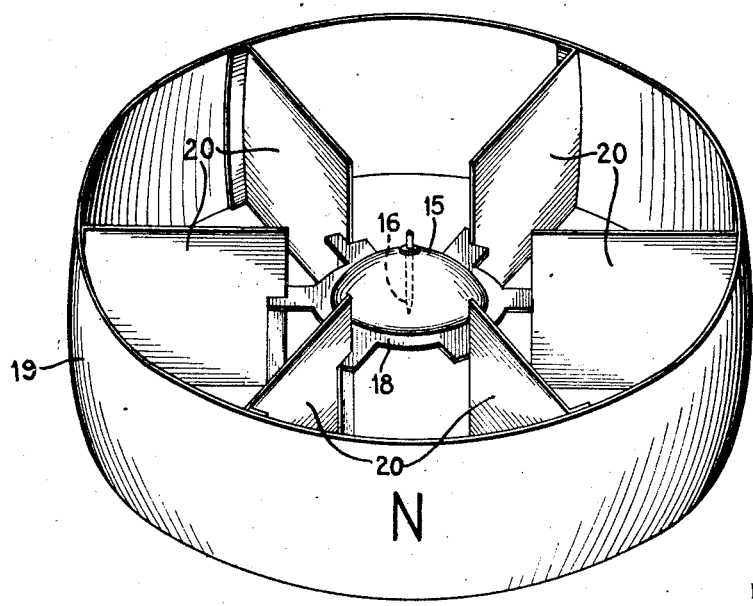
Fig. 2 is a perspective view of the sensitive element.

Referring first to Fig. 1 there is disclosed a container 10 having a cover 12 and a transparent side wall 13 forming a fluid-tight compartment adapted to be filled with fluid. Within the casing there is supported a sensitive element 15 comprising a float chamber 14, a pivot 16, magnets 17, a central plate 18, an outer rim 19 formed radial with respect to said pivot, and a plurality of vanes 20 supported between said central plate and said outer rim. The vanes are arranged vertically so that they enclose the body of liquid between them laterally but present no obstruction to the liquid vertically. That is to say, the sensitive element in the portion which includes the vertical vanes 20 is completely open top and bottom to offer practically no resistance to any movements of the sensitive element around the X and Y axes, that is, around any horizontal axes. The radial formation of the rim also facilitates movement around the X and Y axes because as so formed the liquid offers practically no resistance to the movement of the rim. Movement around the vertical or Z axis, however, will cause the vertical vanes 20 to tend to carry the full body of liquid enclosed between adjacent members 20, thus increasing greatly the moment of inertia around the Z axis. Therefore the undamped Z period of the compass is substantially increased while the moments of inertia of the sensitive element around the X and Y axes, and therefore the undamped periods about these axes, are substantially the same as if the vertical vanes were not employed. The Z period will be not less than 3 minutes while the X and Y periods will by 2 or 3 seconds.

The above sensitive element, therefore, offers a desirable embodiment of the theory set forth in the said Draper and McKay patent application in that the northerly turning error is substantially eliminated because of a greatly increased undamped Z period while retaining relatively fast X and Y periods. The latter are desirable because if the X and Y periods were also increased the card would oscillate excessively in tilt. I have thus provided a compass wherein the undamped Z period is made relatively long while the undamped X and Y periods remain relatively short, thus not only substantially eliminating the northerly turning error but also resulting in a minimum oscillation of the card relative to the craft because the card banks with the craft due to the relatively fast X and Y periods.

Since the sensitive element has a slow period around the Z axis it is desirable that the liquid have low viscosity on the order of less than 1 centistoke to prevent swirl of the liquid from affecting the card. Further, it is desirable that the liquid have a high density, greater than 1. This is for the purpose of increasing the moment of inertia of the sensitive element around the Z axis. Further, the high density permits a small displacement of the sensitive element and therefore there will be but small variation of pivot load when there is change in temperature of the liquid. The reason for this is that the pivot load equals the weight of the sensitive element minus the displacement of the element multiplied by the liquid density. The weight of the card is fixed and the liquid density varies with the temperature. Therefore if the card displacement can be kept small there will be a correspondingly small variation of pivot load with change in temperature of the liquid. Suitable liquids are, for example, trichlorethylene, density 1.465; carbon tetrachloride, density 1.6; and carbon disulphide, density 1.35. Such liquids will enable a sensitive element of small displacement to be used.

The rim 19 and vanes 20 are preferably made of a light material such as magnesium or aluminum whereby a small moment of inertia around the X and Y axes is obtained and this permits fast X and Y periods.

The sensitive element may be mounted in the usual manner upon a bearing 21 supported in any suitable manner at 23 upon a support 22 within the casing 10. The rim 19 of the sensitive element may be provided with azimuth indications which may be read in conjunction with a lubber line 25 seen through the transparent window 13. An expansion chamber 30 may be provided in the usual manner, communicating with the chamber in which the sensitive element operates, said chamber having an expansible bellows 31 therein for taking up the expansion and contraction of the liquid within the casing.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. A magnetic compass adapted to be mounted upon a craft, said compass comprising a casing filled with liquid, a magnetic meridian seeking element, and means for supporting said element in said liquid, said element having means for increasing the period about the vertical axis without substantially increasing the moments of inertia about the horizontal axes, said means comprising means tending to move the liquid enclosed within the element bodily with said element during movements of the element around the vertical axis but adapted to move relative to said liquid enclosed within the element during movements of the element around the horizontal axes.

2. A magnetic compass adapted to be mounted upon a craft, said compass comprising a casing filled with liquid, a magnetic meridian seeking element, and means for supporting said element in said liquid, said element having a plurality of vertical vanes substantially radial of the vertical axis of said element, the spaces between said vanes being open at the top and bottom whereby said vanes tend to maintain the liquid enclosed between the vanes bodily as a unit with said element during relative movements of the element and casing around the vertical axis but move relative to said liquid enclosed between the vanes during movements of the element around the horizontal axes.

3. A magnetic compass adapted to be mounted on a craft, said compass comprising a casing filled with liquid, a magnetic meridian seeking element, and means for pivotally supporting said element for universal movement in said liquid, said element comprising a central portion, an outer rim spaced from said central portion, and a plurality of vanes in vertical planes substantially radial of the vertical axis of said element and forming the sole connection between said rim and said central portion.

4. A magnetic compass adapted to be mounted on a craft, said compass comprising a casing filled with liquid, a magnetic meridian seeking element, and means for pivotally supporting said element for universal movement in said liquid, said element comprising a central portion, an outer rim spaced from said central portion, said rim being formed as part of a sphere having said pivot as its center, and a plurality of vanes in vertical planes substantially radial of the vertical axis of said element and forming the sole connection between said rim and said central portion.

5. A magnetic compass adapted to be mounted on a craft comprising a casing filled with liquid, a magnetic meridian seeking element universally mounted in said casing, said element having means cooperating with the liquid to move a portion thereof bodily with the element in its movements about the vertical axis to impart to said element an undamped period about said vertical axis adequate for substantially eliminating northerly turning error, said means being substantially ineffective to move any of said liquid therewith during movement of the element about said horizontal axes.

6. A magnetic compass adapted to be mounted on a craft, said compass comprising a casing filled with liquid, a magnetic meridian seeking element and means for universally supporting said element in said casing, said element having means for moving a substantial portion of the liquid bodily therewith during movements of the element around the vertical axis and said element being adapted to move substantially none of said liquid during movements of the element around the horizontal axes, whereby a relatively long undamped period around the vertical axis is obtained without substantial increase of the moments of inertia around the horizontal axes.

ELMER A. SPERRY, Jr.